(12) United States Patent
Bast et al.

(10) Patent No.: US 7,593,132 B2
(45) Date of Patent: Sep. 22, 2009

(54) METHOD FOR CALIBRATING PRINTING OF LENTICULAR IMAGES TO LENTICULAR MEDIA

(75) Inventors: Charles A. Bast, Winchester, KY (US); Michael A. Marra, III, Lexington, KY (US); Charles J. Simpson, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 832 days.

(21) Appl. No.: 10/956,935

(22) Filed: Sep. 30, 2004

(65) Prior Publication Data

US 2006/0066879 A1    Mar. 30, 2006

(51) Int. Cl.
 *G06K 15/02*    (2006.01)
(52) U.S. Cl. .................. 358/1.9; 358/1.2; 358/1.18; 358/504; 347/2; 347/3; 347/4; 347/20; 359/462; 359/463
(58) Field of Classification Search .................. 358/1.1, 358/1.16; 347/2, 3, 4, 20; 359/462, 463
See application file for complete search history.

(56) References Cited

U.S. PATENT DOCUMENTS

| | | | |
|---|---|---|---|
| 5,276,478 A * | 1/1994 | Morton ..................... 355/22 |
| 5,424,553 A | 6/1995 | Morton |
| 5,479,270 A | 12/1995 | Taylor |
| 5,557,413 A | 9/1996 | Ebihara et al. |
| 5,633,719 A | 5/1997 | Oehlbeck et al. |
| 5,689,340 A | 11/1997 | Young |
| 5,699,190 A | 12/1997 | Young et al. |
| 5,729,332 A | 3/1998 | Fogel et al. |
| 5,812,152 A * | 9/1998 | Torigoe et al. ................ 347/2 |
| 5,835,194 A | 11/1998 | Morton |
| 5,838,360 A | 11/1998 | Harrold et al. |
| 5,959,718 A | 9/1999 | Morton |
| 5,974,967 A * | 11/1999 | Bravenec et al. ............ 101/211 |
| 6,091,479 A * | 7/2000 | Frosig et al. ................. 355/22 |
| 6,133,928 A | 10/2000 | Kayashima et al. |
| 2002/0113829 A1* | 8/2002 | Nims et al. .................... 347/2 |
| 2002/0187215 A1 | 12/2002 | Trapani et al. |
| 2005/0078163 A1* | 4/2005 | Damera-Venkata ......... 347/106 |
| 2005/0275891 A1* | 12/2005 | Chinwala et al. .......... 358/1.16 |
| 2006/0012878 A1* | 1/2006 | Lipton et al. ................ 359/463 |

\* cited by examiner

*Primary Examiner*—Mark K Zimmerman
*Assistant Examiner*—Kent Yip
(74) *Attorney, Agent, or Firm*—Michael Best & Friedrich, LLP

(57) ABSTRACT

A method for calibrating the printing of a lenticular image with respect to the lenticules of a lenticular sheet includes the step of printing a test pattern including a plurality of patches on a lenticular sheet with an ink jet printer. The patches are sensed though the lenticules with a sensing device and the sensed data is analyzed to determine a calibration factor that is used to subsequently print a lenticular image on the lenticular sheet. In a further embodiment, the method comprises aligning a lenticular sheet in the ink jet printer; sensing the lenticules on said lenticular sheet with the sensing device; analyzing the sensed data in the processing unit to determine the lenticule spacing; calculating a calibration factor based upon the analysis; and using the calibration factor to subsequently print a lenticular image.

34 Claims, 4 Drawing Sheets

0.00
(6.00)

0.02
(6.00)

0.04
(6.00)

0.06
(6.00)

0.08
(6.00)

0.10
(6.00)

0.12

METHOD FOR CALIBRATING PRINTING OF LENTICULAR IMAGES TO LENTICULAR MEDIA

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Invention

The present invention relates generally to a method for automatically calibrating the printing of a lenticular image with respect to the lenticules of a lenticular medium, such as a lenticular sheet, in a device including an ink jet printer, a sensing device, and a processing unit.

2. Description of the Related Art

It is known to print a lenticular image on a sheet of material and then overlay a transparent lenticular sheet in order to achieve one of several special effects. Alternately, the lenticular image can be printed directly on the backside of a transparent lenticular sheet. The lenticular image comprises a series of interlaced image slices, wherein the slices are portions of two or more different source images. The lenticular sheet includes a plurality of semi-cylindrical lenses, or lenticules, arranged in parallel, and the image slices are aligned with the lenticules. The different special effects that can be obtained, for example, include a three-dimensional effect, motion of an object, morphing between two different images, and flipping between different images. For example, a lenticular image can be created by interlacing slices of source images that are different perspective views of an object. Viewing such a lenticular image through the lenticular sheet creates a three dimensional effect. Similarly, if a lenticular image is derived from interlacing source images of an object at sequential points in time, viewing the lenticular image through the lenticular sheet conveys an impression of motion as the position of the viewer changes with respect to the lenticular sheet.

Advances in ink jet printing have allowed lenticular images to be printed using ink jet printers. Achieving a desired lenticular effect depends on precisely printing the lenticular image such that the image slices are precisely aligned with respect to the lenticules of the lenticular medium. Lenticular sheets are generally available with lenticules at such resolutions as 60 lines per inch or 100 lines per inch. However, these given resolutions are generally nominal values, with the actual resolution of the sheet being within a specified range of the nominal value. Similarly, specifications for ink jet printers generally include a nominal printing resolution value, such as 600 dots per inch, with the actual resolution varying within a specified range.

A typical ink jet printer includes one or more printheads mounted on a carriage mechanism. The carriage mechanism is moveable in a lateral (or main printing) direction that is transverse to an advance direction of a print medium such as paper or a lenticular sheet. The printhead is moved in a series of passes across the print medium and during each pass, ink is selectively expelled from nozzles to form ink drops at corresponding ink drop placement locations in the image area of the print medium. Since the printhead moves in a direction transverse to the advance direction of the print medium, each ink ejecting nozzle passes in a linear manner over the print medium. A desired image is thus printed by the combination of lateral printing passes and longitudinal advances of the print medium. In some designs, the printhead is capable of bilateral operation, that is, it expels ink as it moves in a lateral direction across the paper both in a forward direction and in a reverse direction. In some designs the ink jet printer includes a black printhead for printing black ink and a three-color printhead including pens for printing cyan, yellow and magenta ink. Other designs may include separate printheads for each color of ink, or a different numbers of printheads. Further, the ink jet printer may include a printhead alignment sensor, such as described in U.S. Pat. No. 6,655,777, assigned to the assignee of the present invention. These printhead alignment sensors are used to sense the position of the ink drops expelled from the printheads.

Ink jet printers are often part of all-in-one (AIO) devices that typically also include a scanner and a fax module. Such devices can be configured as stand-alone devices or can be coupled to a personal computer or network.

SUMMARY OF THE INVENTION

The invention provides a method for calibrating the printing of a lenticular image with respect to the lenticules of a lenticular sheet. A lenticular sheet is aligned in an ink jet printer such that the lenticules are perpendicular to the main printing direction of the inkjet printer. The inkjet printer is used to print a test pattern including a plurality of patches on the lenticular sheet, wherein the patches are printed on a surface opposite the lenticules and each patch includes a series of lines extending in the same direction as the lenticules. The spacing of the lines within a patch is varied in a known manner from patch to patch. The test pattern is sensed through the lenticular sheet with the sensing device and sensed data is produced for each of the patches. The sensed data is analyzed in a processing unit to determine which patch corresponds to sensed data that has the fewest light and dark bands. One or more calibration factors are calculated based upon the analysis. The one or more calibration factors are used to subsequently print a lenticular image on the same lenticular sheet or a lenticular sheet of the same type.

In an alternate embodiment, the method comprises aligning a lenticular sheet in the ink jet printer such that the lenticules are perpendicular to a main printing direction of the ink jet printer; sensing the lenticules on said lenticular sheet with the sensing device; analyzing the sensed data in the processing unit to determine the lenticule spacing; calculating a calibration factor based upon the analysis; and using the calibration factor to subsequently print a lenticular image.

Other features and advantages of the invention will become apparent to those skilled in the art upon review of the following detailed description, claims, and drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. The order of limitations specified in any method claims does not imply that the steps or acts set forth therein must be performed in that order, unless an order is explicitly set forth.

Figure 1:
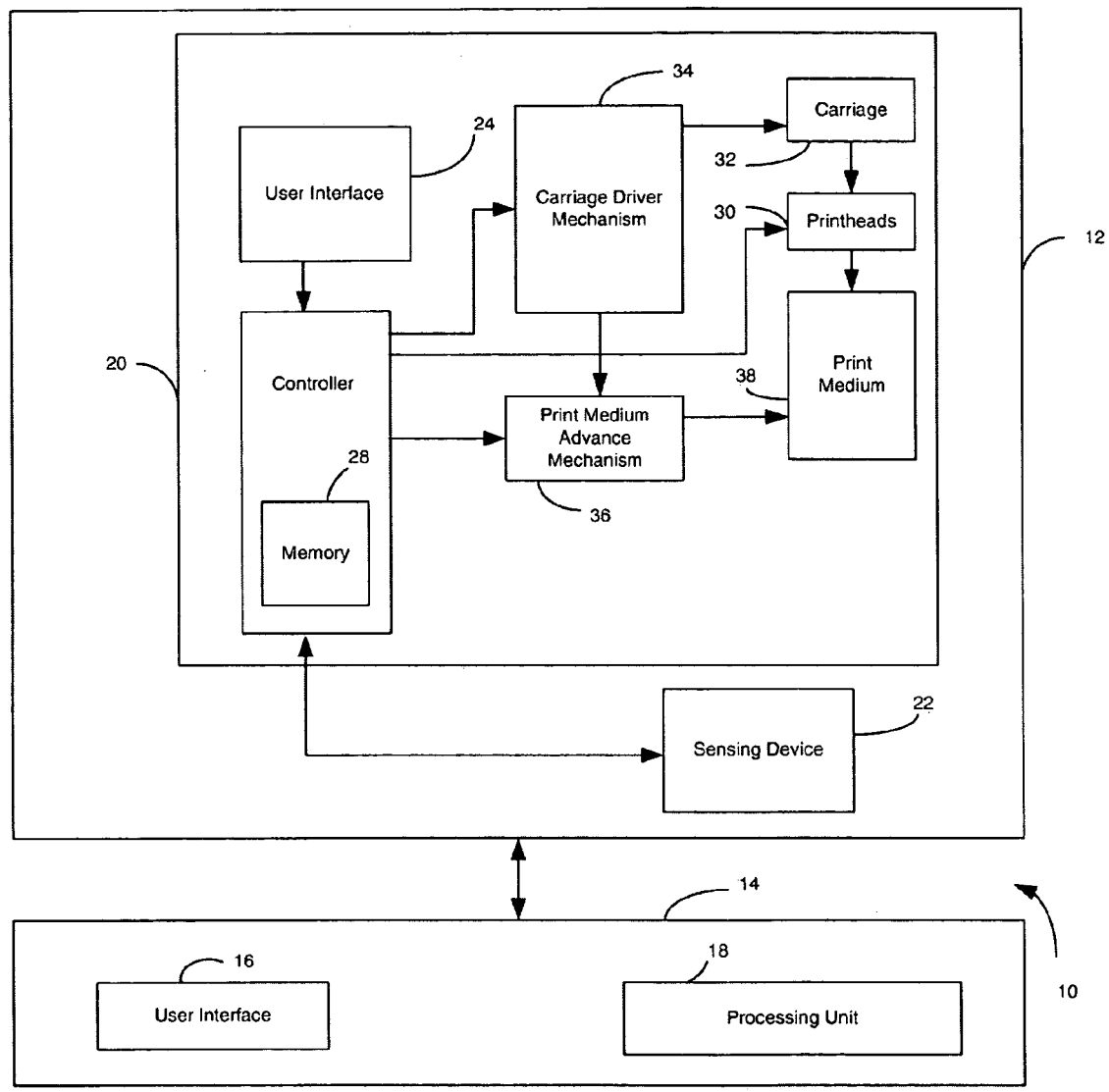
FIG. 1 depicts one embodiment of a system for implementing a method for calibrating the printing of a lenticular image with respect to the lenticules of a lenticular sheet.

Referring to FIG. 1, a system 10 is illustrated that provides an exemplary operating environment for the present invention. System 10 is operable to perform a method for calibrating the printing of a lenticular image with respect to the lenticules of a lenticular sheet, and includes an AIO device 12 connected to a computer 14, such as a personal computer. Computer 14 includes a user interface 16 and a central processing unit 18 having memory and operable to run various application programs. AIO device 12 includes a sensing device 22 and an ink jet printer 20 including one or more printheads 30 operable to print on a print medium such as a sheet of paper or a lenticular sheet. Ink jet printer 20 also includes, for example, a user interface 24, and a controller 26 with memory 28. Further, ink jet printer 20 includes a carriage 32 and carriage drive mechanism 34 for moving the printheads 30 in a main printing direction X (illustrated in FIG. 2), and a print medium advance mechanism 36 for advancing the print medium in an advance direction Y (also illustrated in FIG. 2). Each printhead 30 includes one or more pens each having a plurality of ink ejecting nozzles (not shown) that are selectively controlled to print on the print medium, as is known in the art.

In one embodiment, the sensing device 22 is a scanner. As known in the art, with such a scanner, a sheet of material to be scanned is placed in a scanning region, a light source directs light to the sheet of material, and a photoelectric sensor, such as a contact image sensor or the like, detects the light reflected from the sheet of material. The sensing element produces sensed image data representative of the side of the sheet scanned. For example, in the method described more fully below, the sensed image data is representative of the alignment test pattern as viewed through the lenticular sheet. In an alternate embodiment of the method the sensed image data is representative of the location of the lenticules on the lenticular media.

In a second embodiment where the printed alignment test pattern is being read, the sensing device 22 is a printhead alignment sensor, such as described in U.S. Pat. No. 6,655,777, owned by the assignee of the present invention, and hereby incorporated by reference. For example, an appropriate printhead alignment sensor could be similar to such a sensor shown in FIG. 10, 11 or 12 and described in U.S. Pat. No. 6,655,777.

Another embodiment could use an alignment or media sensor with the lenticular sheet being fed to such sensor where the alignment sensor would be used to directly sense the lenticular media to determine the location of lenticules themselves rather than needing to print and detect a printed alignment test pattern. Where the lenticules are being directly sensed, the alignment sensor needs to be able to resolve the lenticule locations on the lenticular media. Accordingly, it is expected that the alignment sensor could employ a laser diode to provide a laser beam or could have one of an non-laser illumination source beam and a detection aperture having a diameter capable of resolving the lenticules. For example, for lenticular media having 100 LPI, it is expected that either the non-laser LED light beam or the detection aperture of the sensor using a non-laser LED would be less than 0.02 inches in diameter in order to achieve a useable response from the alignment sensor. As the lenticules per inch increases on the lenticular sheet, the beam or aperture diameter will decrease accordingly.

In one embodiment, the sensed image data is communicated to the computer 14, wherein the processing unit 18 is programmed to analyze the sensed image data and calculate a calibration factor, as more fully described below. In the illustrated embodiment, the AIO device 12 is coupled to a personal computer 14 or computer network (not shown). In another embodiment, the device 12 can be a stand-alone device and not coupled to a computer. In such a case, the controller 26 operates as a processing unit.

Figure 2:
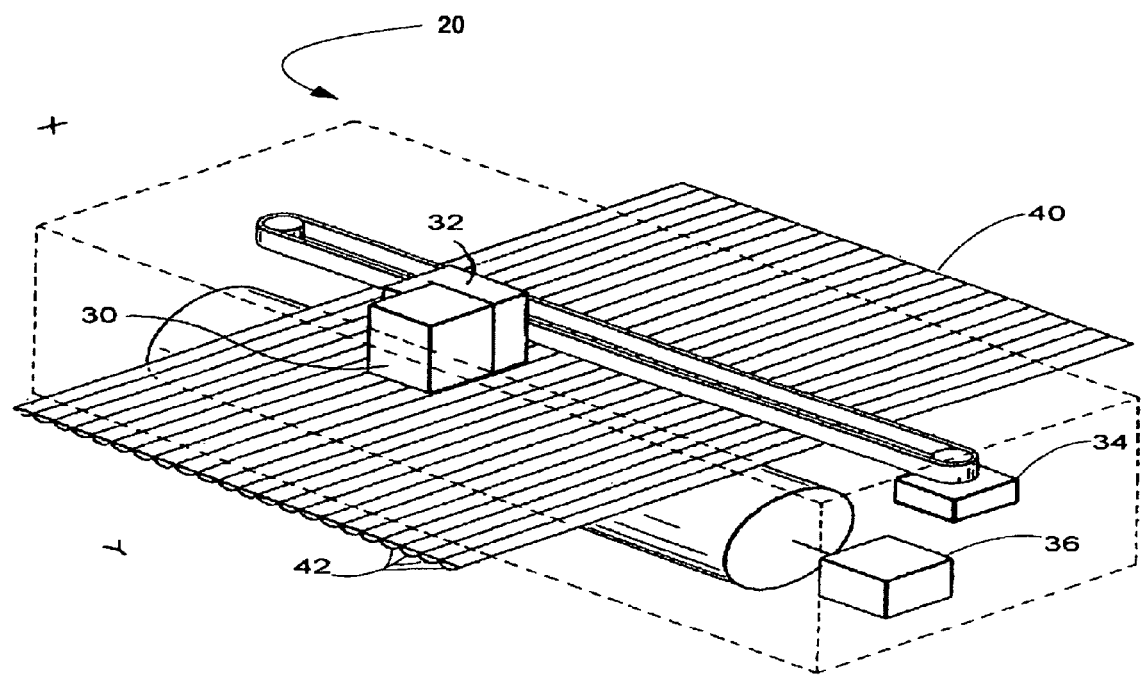
FIG. 2 schematically illustrates the alignment of a lenticular sheet with respect to the printing directions of an ink jet printer.

FIG. 2 schematically illustrates an ink jet printer 20 and the alignment of a lenticular sheet 40 in the ink jet printer 20 for the method described below. In particular, FIG. 2 illustrates the printheads 30 movable in a main printing direction X, and the lenticular sheet 40 movable in an advance direction Y. In one embodiment, the lenticular sheet 40 is transparent and includes a plurality of aligned substantially semi-circular extrusions, or lenticules 42, which are perpendicular to the main printing direction X. The printheads are operable to eject ink drops onto a flat surface of the lenticular sheet that is opposite the lenticules 42.

Figure 3:
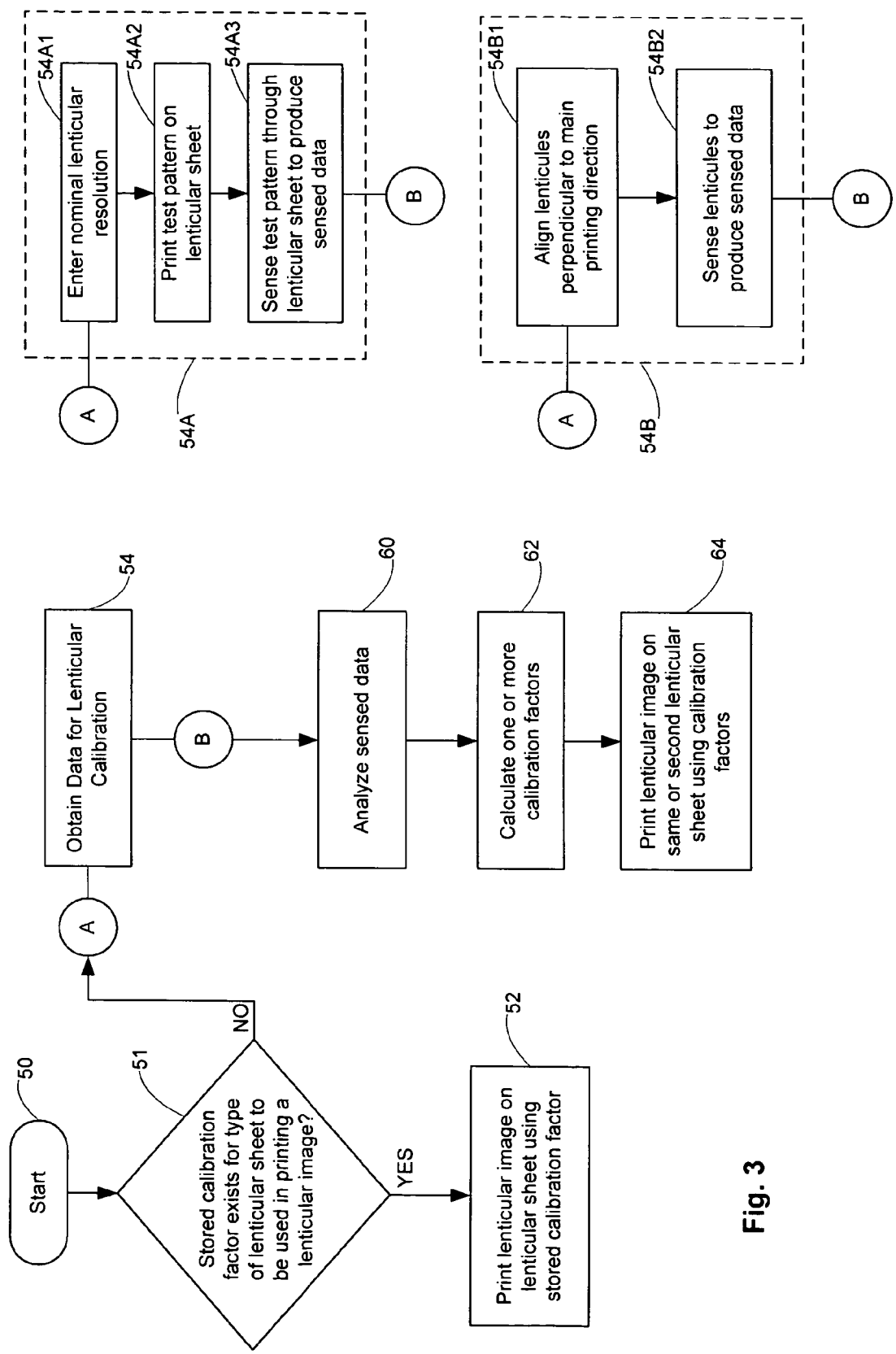
FIG. 3 is a flow chart depicting the steps involved in one embodiment of a method for calibrating the printing of a lenticular image.

Once a user decides to print a lenticular image on a lenticular sheet, FIG. 3 is a flow chart depicting the steps involved in one embodiment of a method for calibrating the printing of the lenticular image to the lenticules of a lenticular sheet. In particular, at step 50, the process starts, then, at step 51, a determination is made whether a calibration factor for the type of lenticular sheet to be used is stored. For example, an application program stored and run on computer 14 can be used to receive input data from a user regarding the type of lenticular sheet to be printed on.

If a stored calibration factor exists, processing proceeds to step 52, and, under the control of the application program, the lenticular image is printed on the lenticular sheet using the stored calibration factor (as further described below).

If a stored calibration factor does not exist, processing proceeds to step 54 to determine one or more calibration factors that can be stored and associated with the particular type of lenticular sheet to be used. As shown in FIG. 3, 54 two alternative embodiments of the method for determining a calibration factor can be used. In general as shown at step 54 calibration data is obtained for the calibration of the lenticular media. Step 54 is further detailed in dashed blocks 54A and 54B, each of which can be substituted for step 54.

As shown in dashed block 54A, at step 54A1, the user inputs the nominal lenticular resolution of the lenticular sheet to be used. For example, the nominal resolution could be 60 lines per inch (LPI), or 100 LPI, or other values, and can be input at the computer 14 running the application program. At step 54A2, under the control of the application program, an appropriate test or calibration pattern is printed on the lenticular sheet 40. The appropriate test pattern will be selected based on the nominal resolution of the sheet 40 and printed on the lenticular sheet as later detailed.

The test pattern is sensed and automatically analyzed. In particular, at step 54A3, the test pattern is sensed with the sensing device. For example, if the sensing device is a scanner, first the lenticular sheet is placed in the scanning region such that the sensor produces sensed data of the test pattern as if viewed through the lenticules. As the lenticular sheet is scanned by the scanner at step 54A3, the sensing device produces sensed data representative of the test pattern that is communicated to the controller 26 and then to the processing unit 18. If the sensing device is a printhead alignment sensor, for example attached to the carriage, then the printhead alignment sensor can be moved with respect to the lenticular sheet to produce sensed data. In such a case, if the printhead alignment sensor were located near the printheads, the lenticular sheet would first have to be flipped over such that the sensor produces sensed data of the test pattern as if viewed through the lenticules.

In an alternate embodiment, as shown in block 54B in FIG. 3, at step 54B1, the lenticular sheet would be aligned such that the lenticules are substantially perpendicular to the main printing direction (the X direction shown in FIG. 2). At step 54B2, sensing of the lenticules is performed by a sensing device having sufficient resolution to determine the location of the lenticules. For example, a media sensor could be used to provide this data. This could be done by inserting the lenticular media into the printer, advancing the lenticular media into a position to be sensed by the media sensor, then, after sensing occurs, ejecting the media from the printer for reuse. The process then proceeds with the analysis of the sensed data at step 60.

In one embodiment, the sensed data is in the form of optical density gray scale values for a plurality of image elements or pixels. The number of pixels obtained is determined by the resolution of the sensing device and the size of the test pattern.

At step 60, the sensed data is analyzed. When a test patch is printed, known edge detection algorithms are used on the sensed data to determine light to dark and dark to light transitions. The patch that corresponds to sensed data that includes the fewest number of light and dark bands is selected either by a user or by the process itself. Alternatively, by analyzing at least three patches, an appropriate calibration factor can be interpolated or extrapolated having improved accuracy over that determined by user selection. When the lenticules are sensed as in step 54B2, edge detection algorithms using super-resolution would be used to determine the locations of individual lenticules on the lenticular sheet.

At step 62, one or more calibration factors are calculated based on the results of the analyzing step, i.e., knowledge regarding the selected patch or patches or knowledge of the location of the lenticules. The spacing of the lines within the selected patch are known, and thus an appropriate calibration factor can be determined that relates actual print resolution to actual resolution of lenticules in the lenticular sheet. Alternatively, knowing the location of the lenticules, an appropriate calibration factor can be determined that relates actual print resolution to actual resolution of lenticules in the lenticular sheet.

Once this relationship is known, at step 64, a lenticular image on the same or a second lenticular sheet can be printed using the calibration factor. The same lenticular sheet can be used when the size of the test pattern is small enough as to not interfere with the subsequently printed lenticular image. Alternatively, a second lenticular sheet can be used that is of the same type as the lenticular sheet having the test patterns printed thereon. With the alternative method illustrated in box 54B, a test patch is not printed on the lenticular sheet that is sensed and this sheet can then also be used for the subsequently printed lenticular image.

To print the test pattern described in step 54A2, the lenticular sheet is arranged in the paper feed of the ink jet printer 20 such that ink will be printed on the lenticular sheet on the surface opposite the lenticules, such as is shown in FIG. 2. The printheads 30 are then translated in a series of passes across the lenticular sheet 40 in the main printing direction X while ink drops are selectively expelled from the ink ejecting nozzles in a desired manner onto the lenticular sheet. In addition to the passes of the printheads, the lenticular sheet is advanced in the media feed direction Y in between the passes of the printhead.

Figure 4:
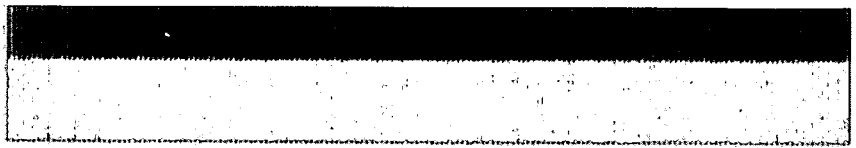
FIG. 4 depicts an example of a test pattern including a plurality of test patches useful in a method for calibrating the printing of a lenticular image with respect to the lenticules of a lenticular sheet.
Figure 4:
Figure 4:
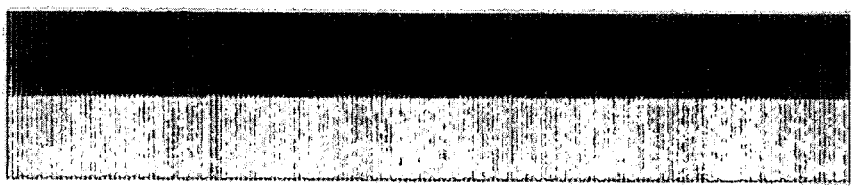
Figure 4:
Figure 4:
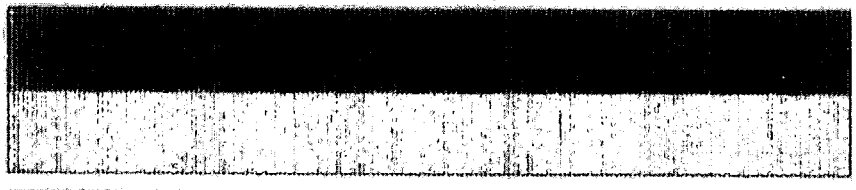
Figure 4:
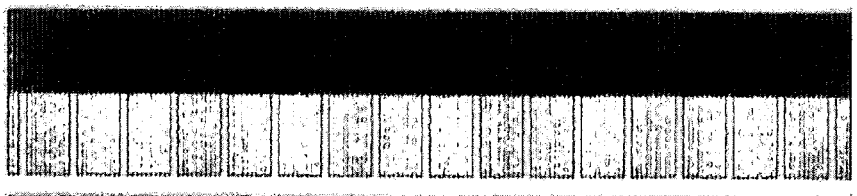
Figure 4:

The quality and resolution of a printed lenticular image is a function of, among other things, the timing of ink drops ejected from the nozzles, and the actual resolution of the lenticular medium. Despite the care taken to assure that the ink drops are ejected at appropriate times and the carriage speed is appropriate to achieve a desired printing resolution of, for example, 600 dots per inch (dpi), the actual resolution in the main printing direction X may vary from the nominal resolution. Thus, the test pattern printed is designed to provide a measure of the actual ink drops printed with respect to the actual lenticular resolution. One example of an appropriate test pattern to be printed is illustrated in FIG. 4. In particular, each row of this pattern is denoted a "patch" and a plurality of patches are printed. Each patch includes a series of line segments extending in the same direction as the lenticules, and the pattern of the line segments within a patch is varied in a known manner from patch to patch. For example, the test pattern depicted in FIG. 4 is a test pattern that corresponds to a lenticular resolution of 100 LPI, and a print resolution of 600 dpi. Theoretically, 6 ink drops (or line segments) in main print direction X would correspond to a single lenticule of the lenticular sheet. By varying the number of line segments printed from patch to patch, e.g., by adding or deleting line segments, an actual relationship between printed line segments and lenticules can be determined.

When the printed test pattern is viewed through the lenticules, the misregistration between line segments and the lenticules manifests itself as a moiré effect, or a series of vertical bands. In other words, the vertical banding is indicative of the difference in pitch between the line segments and the lenticules of the lenticular sheet. Determining which patch of the test pattern as viewed through the lenticules includes the fewest light to dark and dark to light transitions provides an indication of which patch best matches the lenticular pitch. The light and dark bands appear at frequency proportional to the error between the calibration pattern and the lenticular sheet.

Although the patches are depicted as each being a single row, the patches could be grouped together in one or more rows, in order to take up less space. Further, it is possible that each patch to be a single row and extend completely across the lenticular sheet. In this case, rather than producing a single calibration factor, or in other words, a "bulk quantification" factor indicative of the relationship between placement of ink drops and the lenticular resolution of the lenticular sheet, a plurality of calibration factors could be determined. For example, the lenticular sheet can be divided into a plurality of vertical strips, and a calibration factor could be determined for each of the vertical strips.

In prior art methods, a user viewed the test pattern through the lenticules and made the determination as to which patch contained the fewest number of light/dark bands, and entered that information into an application program. This technique is disadvantageous in that it is subject to user misinterpretation of the instructions, as well as errors in selecting the correct patch and entering the appropriate information. Also, the number of sample patches to be printed must be large enough to cover the entire range of potential calibration values that are expected. This printing is a time consuming process given the high resolution of the test pattern that is required to generate acceptable results. Printing the calibration test pattern on the lenticular sheet can make it no longer usable for printing the desired lenticular image, depending on the size of the image to be printed.

A lenticular image comprises a series of interlaced image slices, wherein the slices are portions of two or more different source images. The lenticular image is in the form of a plurality of pixels, each having an associated value.

In one embodiment, prior to printing the lenticular image, the lenticular image is "resampled" using appropriate interpolation algorithms to obtain a different pixel spacing of the lenticular image that better matches the ink drop ejection timing relative to the lenticules of the lenticular sheet.

In another embodiment, prior to printing the lenticular image, an accumulated error is calculated, and pixels of the lenticular image are dropped, i.e., not printed, when the accumulated error becomes greater than a specified amount. In this manner, a better fit between the printed pixels and the lenticules is obtained.

In a further embodiment, the calibration factor can be used to adjust the timing of the ejection of ink drops from the ink jet printer when printing the lenticular image to better match the actual resolution of the lenticules. Adjustment of the ejection timing greatly improves the ability of an inkjet printer to place dots relative to the lenses or lenticules. Attempting to match the resolution of the lenticules with respect to that of the printing device and adjusting for an optimal view distance and the common spacing between the human eyes is used to achieve an optimal 3d effect. For instance, for an inkjet printer with base resolution of 600 dpi, the ideal resolution of the lenticular media would be 100 LPI. Assuming a 12 inch viewing distance and a nominal 2.8 inch eye-to-eye distance, the correction factor would be about 0.4 LPI, resulting in an optimal resolution of 100.4 LPI. Using an adjustable delay time in the printer system essentially stretches the image to match the optimal resolution with respect to the lenticules.

Assuming a nominal lenticular media resolution, placement of the dots is adjusted based on the relationship between the resolution of the printer, the lenticular media, and the viewing angle. Equation 1 approximates this relationship:

$$xd = x*(d/D+a) \qquad \text{Eq. 1}$$

where x is the position on the page, D is the viewing distance, d is the distance from the optical axis of the lenticules to the image and the parameter a is a scale factor adjustment for the offset in resolution between the printing device and the lenticular media.

For example, if the printer is exactly 600 dpi, and the lenticules are spaced at 101 LPI, assuming 6 images per lenticule, the ratio would be a=1−6*101/600=−0.01. The resultant value for xd is therefore the adjustment needed to optimally place the image intended for location x.

If a timer is used to adjust placement, the delay value to set in the timer is found via Eq. 2:

$$T_{delay} = xd/V \qquad \text{Eq. 2}$$

where V the velocity of the carrier, and $T_{delay}$ is the delay used to offset placement of the drops.

Because the variables xd can have a negative value, a nominal offset can be included in the above equation to avoid negative delay values. The above equations can also be modified to allow adjustments for nonlinearities present in the particular lenticular media of interest.

Various features and advantages of the invention are set forth in the following claims.

What is claimed is:

1. A method for calibrating the printing of a lenticular image with respect to the lenticules of a lenticular sheet in a system including an ink jet printer, a sensing device, and a processing unit, the method comprising the steps of:
   aligning a lenticular sheet in the ink jet printer such that the lenticules are perpendicular to a main printing direction of the ink jet printer;
   using the ink jet printer to print a test pattern including a plurality of patches on the lenticular sheet, wherein the patches are printed on a surface opposite the lenticules, each patch includes a series of line segments extending in the same direction as the lenticules, and the pattern of the line segments within a patch is varied in a known manner from patch to patch;
   sensing the test pattern through the lenticular sheet with the sensing device and producing sensed data for each of the patches;
   analyzing the sensed data in the processing unit to determine which patch corresponds to sensed data that has the fewest light and dark bands;
   calculating a calibration factor based upon the analysis; and
   using the calibration factor to subsequently print a lenticular image, wherein the lenticular image is subsequently printed on the same lenticular sheet having the test pattern and wherein the calibration factor is used to calculate an accumulated error and pixels of the lenticular image are dropped when the accumulated error is greater than a specified amount.

2. The method of claim 1, wherein the calibration factor is used to determine an appropriate pixel spacing for the lenticular image prior to printing the lenticular image.

3. The method of claim 1, wherein the calibration factor is used to adjust the timing of the ejection of ink drops from the ink jet printer when printing the lenticular image.

4. The method of claim 3 wherein adjustment of the timing of the ejection of the ink drops further comprises:
   determining the value of a variable xd as follows:

$$xd = x*(d/D+a)$$

where x is the position on the lenticular sheet, D is the viewing distance to the lenticular sheet, d is the distance from the optical axis of the lenticules to the image, and a is a scale factor adjustment for the offset in resolution between the ink jet printer and the lenticular sheet; and
   determining a time delay value $T_{delay}$ to adjust the ejection timing of the ink drops as follows:

$$T_{delay}=xd/V$$

where V the velocity of the carrier.

5. The method of claim 4 wherein the time delay includes an offset value of sufficient magnitude to avoid negative delay values.

6. The method of claim 3 wherein adjustment of the timing of the ejection of the ink drops further comprises:
   determining the value of a variable xd based upon a position of the lenticular sheet, the viewing distance to the lenticular sheet and the distance from the optical axis of the lenticules of the image; and
   determining a time delay value to adjust the ejection timing of the ink drop based upon the variable xd and a velocity of the carrier.

7. The method of claim 6 wherein the time delay includes an offset value of sufficient magnitude to avoid negative delay values.

8. The method of claim 1, wherein the calibration factor is stored and associated with a type of the lenticular sheet.

9. The method of claim 8, wherein the lenticular image is printed on a second lenticular sheet that is the same type as the lenticular sheet analyzed.

10. The method of claim 9, wherein the calibration factor is used to adjust the timing of the ejection of ink drops from the ink jet printer when subsequently printing onto the second lenticular sheet.

11. The method of claim 9, wherein the calibration factor is used to determine an appropriate pixel spacing for the lenticular image to be printed.

12. The method of claim 9, wherein the calibration factor is used to calculate an accumulated error and pixels of the lenticular image are dropped when the accumulated error is greater than a specified amount.

13. The method of claim 1, wherein the sensing device is a line scanner.

14. The method of claim 1, wherein the sensing device is a printhead alignment sensor.

15. The method of claim 1, wherein the test pattern printed depends on a nominal resolution of lenticules of the lenticular sheet.

16. The method of claim 1, wherein a user initiates the sensing step.

17. A method for calibrating the printing of a lenticular image with respect to the lenticules of a lenticular sheet in a system including an ink jet printer, a sensing device, and a processing unit, the method comprising the steps of:
   printing a test pattern including a plurality of patches on a first lenticular sheet with the ink jet printer, wherein the patches are printed on a surface opposite the lenticules, each patch includes a series of line segments with the line segments extending in the same direction as the lenticules of the first lenticular sheet as aligned in the ink jet printer, each patch extends across substantially the entire width of the first lenticular sheet, and the pattern of the line segments within a patch is varied in a known manner from patch to patch;
   sensing the patches through the first lenticular sheet with the sensing device and producing sensed data for each of the patches;
   analyzing the sensed data in the processing unit to determine, for each of a plurality of vertical strips of the first lenticular sheet, which patch corresponds to sensed data in that vertical strip has the fewest light and dark bands;
   calculating and storing a plurality of calibration factors for each vertical strip based upon the analysis; and
   using the calibration factors to subsequently print a lenticular image on a second lenticular sheet that is the same type as the first lenticular sheet, wherein the calibration factor is used to calculate an accumulated error and pixels of the lenticular image are dropped when the accumulated error is greater than a specified amount.

18. The method of claim 17, wherein the calibration factors are used to adjust the timing of the ejection of ink drops from the ink jet printer when printing onto the second lenticular sheet.

19. The method of claim 17, wherein the calibration factors are used to determine an appropriate pixel spacing for the lenticular image to be printed to better match the spacing of the lenticules in each of the vertical strips of the second lenticular sheet.

20. The method of claim 17, wherein the sensing device is a line scanner.

21. The method of claim 17, wherein the sensing device is a printhead alignment sensor.

22. The method of claim 17, wherein the test pattern printed depends on a nominal resolution of lenticules of the first lenticular sheet.

23. The method of claim 17, wherein a user initiates the sensing step.

24. The method of claim 17 wherein adjustment of the timing of the ejection of the ink drops further comprises:
   determining a time delay value to adjust the ejection timing of the ink drop based upon a distance of the lenticular sheet, the viewing distance of the lenticular sheet, the distance from the optical axis of the lenticules to the image, and a velocity of the carrier.

25. The method of claim 24, wherein the time delay includes an offset value of sufficient magnitude to avoid negative delay values.

26. A method for calibrating the printing of a lenticular image with respect to the lenticules of a lenticular sheet in a system including an ink jet printer, a sensing device, and a processing unit, the method comprising the steps of:
   determining if a stored calibration data for the lenticular sheet exist and if not aligning a lenticular sheet in the ink jet printer such that the lenticules are perpendicular to a main printing direction of the ink jet printer;
   sensing the lenticules on said lenticular sheet with the sensing device;
   analyzing the sensed data in the processing unit to determine the lenticule spacing;
   calculating a calibration factor based upon the analysis; and
   using the calibration factor to subsequently print a lenticular image, wherein the calibration factor is used to adjust the timing of the ejection of ink drops from the ink jet printer when printing the lenticular image and wherein adjustment of the timing of the ejection of the ink drops further comprises:
   determining the value of a variable xd as follows:

$$xd=x^*(d/D+a)$$

where x is the position on the lenticular sheet, D is the viewing distance to the lenticular sheet, d is the distance from the optical axis of the lenticules to the image, and a is a scale factor adjustment for the offset in resolution between the ink jet printer and the lenticular sheet; and
   determining a time delay value $T_{delay}$ to adjust the ejection timing of the ink drops as follows:

$$T_{delay}=xd/V$$

where V the velocity of the carrier.

27. The method of claim 26 wherein the time delay includes an offset value of sufficient magnitude to avoid negative delay values.

28. The method of claim 26, wherein a user initiates the sensing step.

29. The method of claim 26, wherein the calibration factor is used to determine an appropriate pixel spacing for the lenticular image prior to printing the lenticular image.

30. The method of claim 26, wherein the calibration factor is used to calculate an accumulated error and pixels of the lenticular image are dropped when the accumulated error is greater than a specified amount.

31. The method of claim 26, wherein the calibration factor is stored and associated with a type of the lenticular sheet.

32. The method of claim 26, wherein the sensing device is a printhead alignment sensor capable of resolving the location of the lenticules on the lenticular sheet.

33. The method of claim 32 wherein the printhead alignment sensor uses a laser beam.

34. The method of claim 32 wherein the printhead alignment sensor uses a non-laser illumination source wherein one of the diameter of the illumination source beam and a detection aperture have a diameter capable of resolving the location of the lenticules.

* * * * *

UNITED STATES PATENT AND TRADEMARK OFFICE
CERTIFICATE OF CORRECTION

PATENT NO. : 7,593,132 B2
APPLICATION NO. : 10/956935
DATED : September 22, 2009
INVENTOR(S) : Bast et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1301 days.

Signed and Sealed this

Twenty-first Day of September, 2010

David J. Kappos
*Director of the United States Patent and Trademark Office*